(12) United States Patent  
Atwell et al.

(10) Patent No.: US 9,811,619 B2
(45) Date of Patent: Nov. 7, 2017

(54) LOW DROP-OUT VOLTAGE REGULATOR MODELING SYSTEMS AND METHODS

(71) Applicant: TEXAS INSTRUMENTS INCORPORATED, Dallas, TX (US)

(72) Inventors: Robert Nichols Atwell, Tucson, AZ (US); Britt Eric Brooks, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 506 days.

(21) Appl. No.: 14/485,721

(22) Filed: Sep. 13, 2014

(65) Prior Publication Data

US 2015/0112502 A1    Apr. 23, 2015

Related U.S. Application Data

(60) Provisional application No. 61/894,234, filed on Oct. 22, 2013.

(51) Int. Cl.
*G06F 17/50*  (2006.01)
*G05F 1/56*  (2006.01)

(52) U.S. Cl.
CPC ...... *G06F 17/5036* (2013.01); *G06F 17/5063* (2013.01); *G05F 1/56* (2013.01); *G06F 17/5045* (2013.01); *G06F 2217/78* (2013.01)

(58) Field of Classification Search
CPC .................... G06F 17/5036; G06F 2217/78

USPC ........................................... 716/133; 700/298
See application file for complete search history.

(56) References Cited

U.S. PATENT DOCUMENTS

| | | | |
|---|---|---|---|
| 7,269,804 B2* | 9/2007 | Tabery | G03F 7/705 |
| | | | 430/5 |
| 7,945,889 B2* | 5/2011 | Hsu | G06F 17/5036 |
| | | | 703/13 |
| 8,166,447 B1* | 4/2012 | Smith | G06F 17/5036 |
| | | | 716/132 |
| 9,087,164 B2* | 7/2015 | Perry | G06F 17/50 |
| 9,323,880 B2* | 4/2016 | Madananth | |
| 2014/0176098 A1 | 6/2014 | Fang | |

* cited by examiner

*Primary Examiner* — Michael Rutland Wallis
(74) *Attorney, Agent, or Firm* — John R. Pessetto; Charles A. Brill; Frank D. Cimino (57) ABSTRACT

A specialized low drop-out voltage regulator (LDO) computer system stores a generalized base model of an LDO. The base model includes values representing a circuit topology and a set of analog behavior blocks associated with the generalized LDO. Values of a set of operational parameters associated with a specific model of LDO are input to the specialized LDO computer system from a data sheet associated with the specific model of LDO. The specialized LDO computer system transforms the set of operational parameters into a computer model of the specific LDO. The LDO-specific computer model is output as a netlist or as a set of instantiation control values to control external hardware such as an integrated circuit die tooling system or a computer graphical display system.

20 Claims, 7 Drawing Sheets

LOW DROP-OUT VOLTAGE REGULATOR MODELING SYSTEMS AND METHODS

PRIORITY CLAIM

This application claims the benefit of priority under 35 U.S.C. §119(e) to U.S. Provisional Patent Application Ser. No. 61/894,234 titled "A Universal, Parameterized LDO Model With Automatic Generation From Datasheet Parameters," filed on Oct. 22, 2013 and incorporated herein by reference in its entirety.

TECHNICAL FIELD

Embodiments described herein relate to systems and methods associated with electronic circuit modeling, including the transformation of data sheet parameters to a behavioral model of a low drop-out voltage regulator.

BACKGROUND INFORMATION

Figure 1:
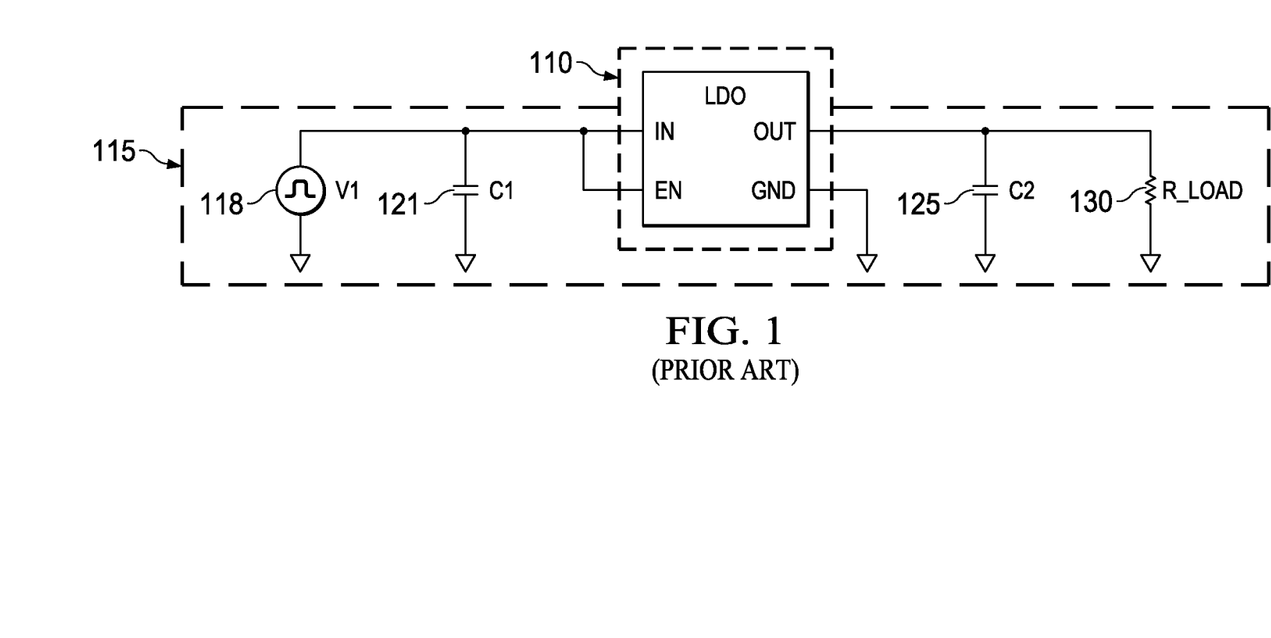
FIG. 1 is a prior-art schematic diagram of a low drop-out voltage regulator ("LDO") integrated circuit ("IC") in a simplified typical use application.

FIG. 1 is a prior-art schematic diagram of a low drop-out voltage regulator ("LDO") integrated circuit ("IC") 110 in a simplified typical use application. The LDO IC 110 may be manufactured by a first semiconductor manufacturer and used as a component in an electronic circuit 115 by a second manufacturer. The example circuit 115 includes an input voltage source 118, an input filter capacitor 121, an output filter capacitor 125, and a load resistor 130. The load resistor 130 represents the load at the regulated output of the LDO 110.

The second manufacturer may wish to perform computer characterizations and simulations of the behavior of the circuit 115 under various steady-state and transient conditions of input voltage, load, external electromagnetic interference ("EMI"), etc. Such characterizations and simulations may include the behavior of individual components and portions of the circuit 115 that are shown as lumped into the load resistor 130 of FIG. 1. However, the second manufacturer may not have available the exact configuration and component values of the circuit internal to the LDO IC 110. The aforesaid "blind spot" may require the second manufacturer to perform complex, time-intensive characterizations and modeling of the LDO IC 110 as a preliminary step to modeling the circuit 115 itself.

SUMMARY OF THE INVENTION

Systems and methods described herein transform values of a set of operational parameters from a data sheet associated with an LDO into a computer model of the LDO. A computer specialized with blocks of instructions and data structures including a base model effects the transformation. The base model accommodates both fixed and variable output voltage LDOs. Some embodiments and methods may include one or more instantiation blocks of instructions to generate commands to hardware subsystems (e.g., die tooling hardware including mask generators). Some embodiments and methods output the LDO computer model in a format such as a netlist or a very high speed IC ("VHSIC") hardware description language ("VHDL") for subsequent input to an electrical circuit simulator such as a simulation program with IC emphasis ("SPICE").

The disclosed structures thus transform simple parameter values from a data sheet associated with a particular LDO into a complete computer model of the LDO. Doing so may save time and engineering cost associated with performing complex, time-intensive characterizations and modeling of the LDO as a preliminary step to modeling a circuit for which the LDO is a component.

DETAILED DESCRIPTION

Figure 2:
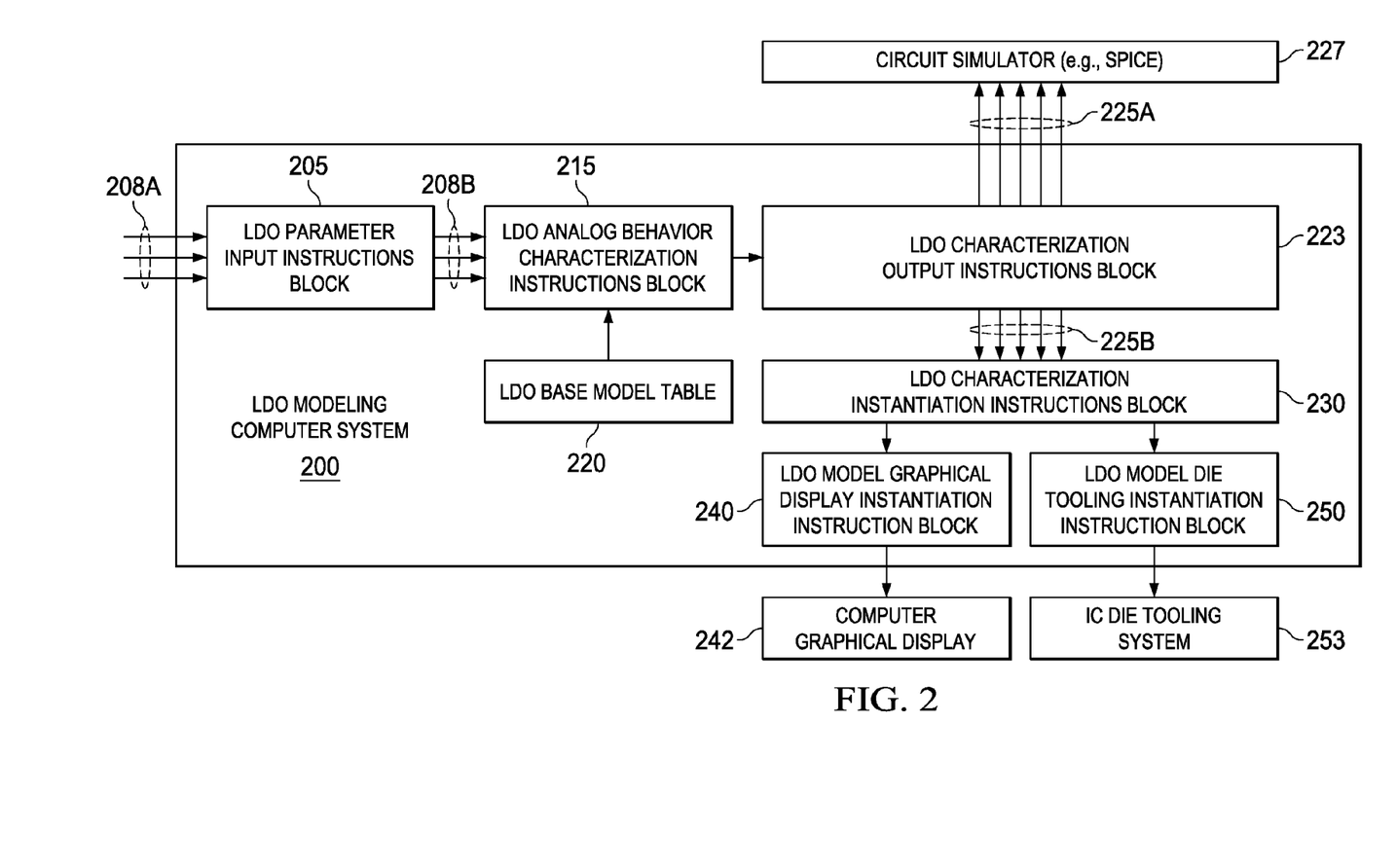
FIG. 2 is diagram of a specialized LDO modeling computer system according to various example embodiments.

FIG. 2 is diagram of a specialized LDO modeling computer system 200 according to various example embodiments. It is noted that FIG. 2 shows the data structures and instruction blocks stored in a memory which result in the specialized character of the LDO modeling computer system 200. The LDO modeling computer system 200 also includes a processor, one or more semiconductor memories, input and output ("I/O") devices such as I/O port devices, mass storage devices such as hard drives or solid-state drives, etc. The latter devices are not shown in FIG. 2 for the sake of clarity.

The LDO modeling computer system 200 includes an LDO parameter input instructions block 205. The LDO parameter input instructions block 205 accepts parameter values 208A associated with a particular model of LDO and found on a data sheet for the LDO. The parameter values 208A may be input manually or copied from the data sheet by an optical character recognition ("OCR") scanner coupled to the system 200 or to a component thereof.

The system 200 also includes an LDO analog behavior characterization instructions block 215 coupled to the input instructions block 205. The system 200 further includes an LDO base model table 220 coupled to the analog behavior characterization instructions block 215. The base model table 220 stores base model values representing a circuit topology and a set of analog behavior blocks ("ABBs") associated with a generalized LDO base model as further described below. The analog behavior characterization instructions block 215 receives the parameter values 208B from the parameter input instructions block 205. The analog behavior characterization instructions block 215 then transforms parameter values 208B into the computer model of the LDO using characteristics of the base model to effect the transformation as further described below. For purposes of this disclosure, "characteristics of the base model" means circuit components of the base model arranged in a circuit topology associated with the base model and transfer functions of ABBs associated with the base model, all as represented by base model values stored in the base model table 220. It is noted that the LDO modeling computer system 200 models both fixed and variable output voltage LDOs. The base model represented by values stored in the LDO base model table 220 varies slightly between fixed and variable output voltage LDOs as further described below.

The system 200 further includes an LDO characterization output instructions block 223 coupled to the LDO analog behavior characterization instructions block 215. The LDO characterization output instructions block 223 outputs a computer model 225A and 225B of the LDO for which the data sheet parameter values are input. The computer model 225A, 225B includes the base model with component values of the base model and results of transfer functions of ABB components of the base model as determined by the LDO analog behavior characterization instructions block 215. The LDO computer model 225A may be output to a circuit simulator 227 such as SPICE. Some embodiments may output the LDO computer model 225B to an LDO characterization instantiation instructions block 230 coupled to the LDO characterization output instructions block 223. The LDO characterization instantiation instructions block 230 generates instantiation control values to be used by a hardware device to perform operations based upon the computer model of the LDO.

For example, some embodiments of the system 200 may also include an LDO model graphical display instantiation instruction block 240 coupled to the LDO characterization instantiation instructions block 230. The LDO model graphical display instantiation instruction block 240 provides display instantiation control values to a computer graphical display (e.g., to the graphical display 242) to cause the computer graphical display to create one or more representations of the computer model of the LDO. Considering another example, some embodiments of the system 200 may include an LDO model die tooling instantiation instruction block 250 coupled to the LDO characterization instantiation instructions block 230. The LDO model die tooling instantiation instruction block 250 provides IC die tooling instantiation control values to an IC die tooling sub-system 253. The IC die tooling instantiation control values cause the IC die tooling sub-system 253 to create one or more IC die designs of the LDO.

Figure 3:
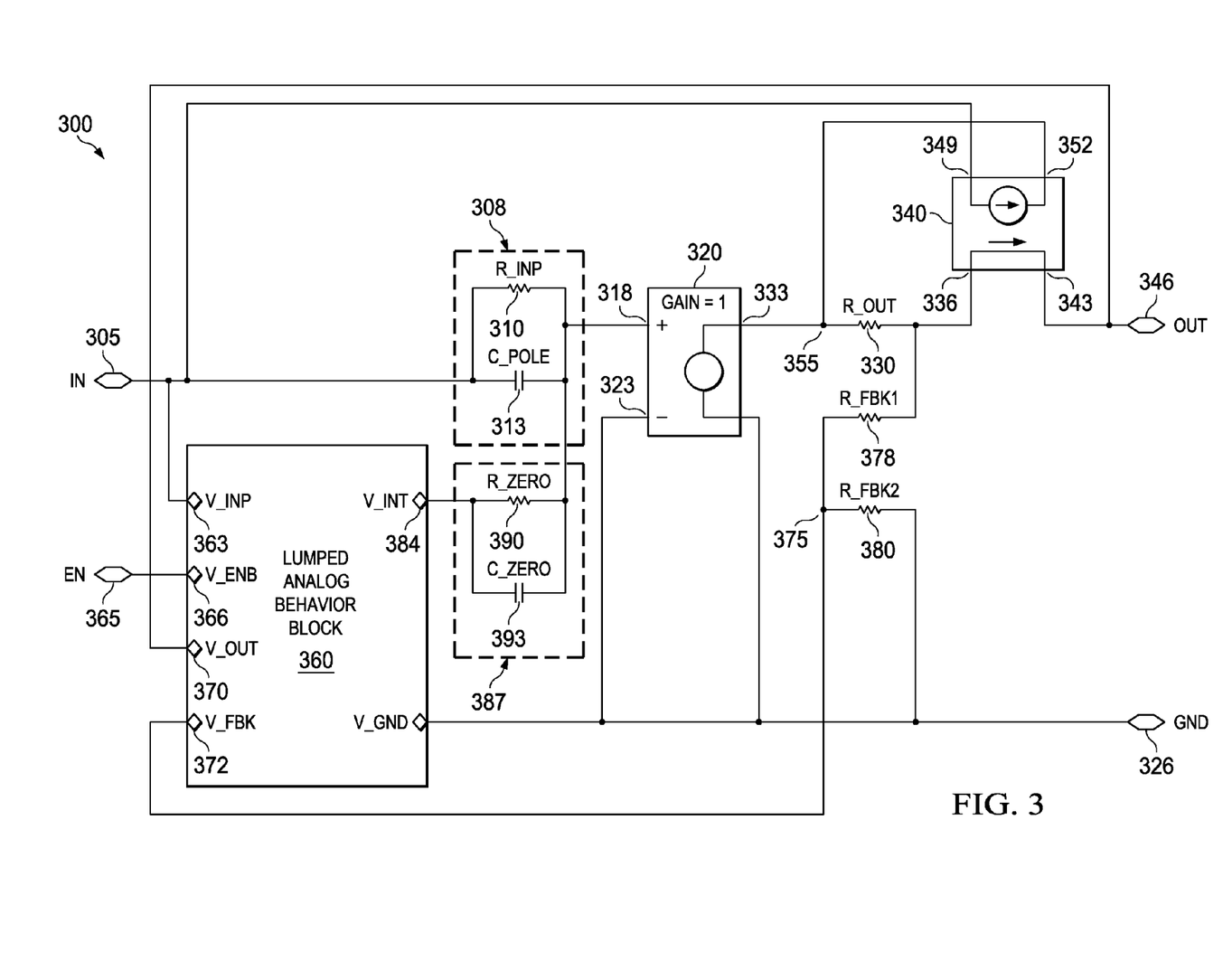
FIG. 3 is a schematic diagram of a generalized fixed output voltage LDO base model according to various example embodiments.

FIG. 3 is a schematic diagram of a generalized fixed output voltage LDO base model 300 according to various example embodiments. The LDO modeling computer system 200 of FIG. 2 includes an LDO base model table 220 to store values representing circuit topology and a set of analog behavior blocks associated with the LDO base model 300, as previously mentioned.

The LDO base model 300 includes an input voltage terminal ("IN") 305 to receive an LDO input voltage ("V_INP") from an input voltage source (not shown). The LDO base model 300 also includes a parallel resistor-capacitor ("RC") input network 308 coupled to the input voltage terminal 305. The RC input network 308 includes an input resistor 310 representing an estimated LDO input resistance R_INP. The RC input network 308 also includes an input capacitor 313. The input capacitor 313 represents a pole capacitance C_POLE associated with a frequency response of the LDO. The parallel RC input network 308 is coupled in series between IN 305 and a positive input terminal 318 of a voltage-controlled voltage source ("VCVS") 320. A negative input terminal of the VCVS 320 is coupled to an LDO output ground terminal ("GND") 326.

The LDO base model 300 further includes an output resistor 330 representing a nominal output resistance ROUT of the LDO. The output resistor 330 is coupled in series between a positive output terminal 333 of the VCVS 320 and an input source terminal 336 of a current-controlled current source ("CCCS") 340. An input sink terminal 343 of the CCCS 340 is coupled to an LDO output voltage terminal ("OUT") 346. An output source terminal 349 of the CCCS 340 is coupled to IN 305. An output sink terminal 352 of the CCCS 340 is coupled to a node 355 between the positive output terminal 333 of the VCVS 320 and the output resistor 330.

The LDO base model 300 also includes a lumped ABB ("LABB") 360. A first input terminal 363 of the LABB 360 is coupled to IN 305 to receive V_INP. A second input terminal 366 of the LABB 360 is coupled to an LDO chip enable input terminal ("EN") 365. The second input terminal 366 receives a chip enable input voltage ("V_ENB") from the LDO input terminal 365. A third LABB input terminal 370 is coupled to OUT 346 to receive a nominal regulated output voltage ("V_OUT") of the LDO. A fourth LABB input terminal 372 is coupled to a junction 375 of two feedback resistors, 378 and 380. The LABB receives a feedback voltage signal ("V_FBK") at the input terminal 372. The feedback resistor 378 has a resistance R_FBK1 and is coupled to the input source terminal 336 of the CCCS 340. The feedback resistor 380 has a resistance R_FBK2 and is coupled to the LDO GND terminal 326. The LABB also includes an output terminal 384 to output an intermediate voltage V_INT. The LABB output terminal 384 is coupled to a junction of a parallel RC zero-creating filter 387. The zero-creating filter 387 includes a resistor 390 of resistance R_ZERO and a capacitor 393 of capacitance C_ZERO. An opposite junction of the RC zero-creating filter 387 is coupled to the positive input 318 of the VCVS 320.

Figure 4:
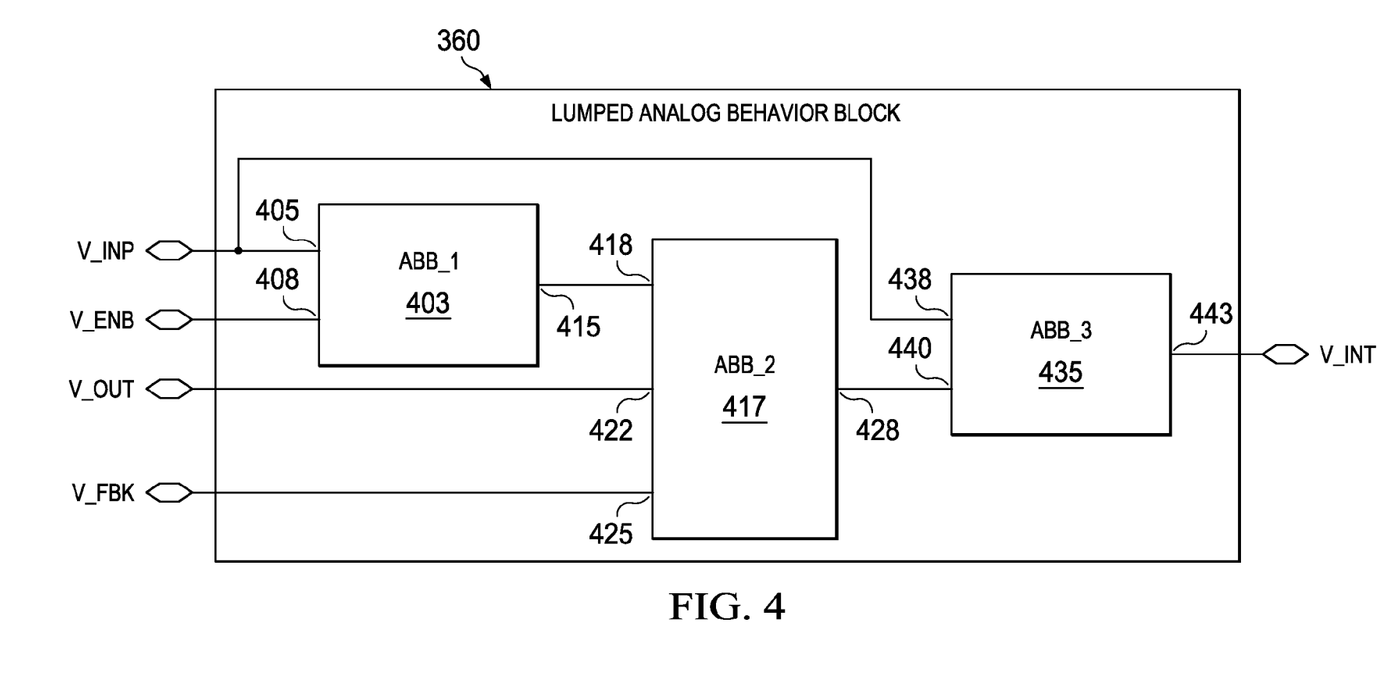
FIG. 4 is a block diagram of an analog behavioral block associated with an LDO base model according to various example embodiments.

FIG. 4 is a block diagram of a lumped analog behavioral block (e.g., the LABB 360 of FIG. 3) associated with an LDO base model according to various example embodiments. The LABB 360 includes a set of cascaded ABBs (e.g., ABB_1 403, ABB_2 417 and ABB_3 435). ABB_1 includes a first input terminal 405 to receive V_INP, a second input terminal 408 to receive V_ENB and an output terminal 415 to output a first ABB transfer function voltage ABB_1_VOUT. ABB_2 includes a first input terminal 418 to receive ABB_1_VOUT, a second input terminal 422 to receive V_OUT, a third input terminal 425 to receive V_FBK and an output terminal 428 to output a second ABB transfer function voltage ABB_2_VOUT. ABB_3 includes a first input terminal 438 to receive V_INP, a second input terminal 440 to receive ABB_2_VOUT, and an output terminal 443 to output V_INT.

Turning back to FIG. 2, the LDO modeling computer system 200 receives a set of operational parameter values 208A at LDO parameter input instructions block 205 as previously mentioned. The values 208A are associated with operational parameters of a specific model of LDO and are generally found on a data sheet for the specific model of LDO. The operational parameters include V_OUT, R_INP, R_OUT, a power supply rejection ratio ("PSRR") defined as ΔV_OUT/ΔV_INP, a frequency of a first pole in a PSRR response characteristic ("POLE"), a frequency of a first zero in a PSRR response characteristic ("ZERO"), a threshold voltage ("V_THR") at which the LDO recognizes V_ENB, a minimum voltage level of V_INP ("UVLO") at which the LDO will operate, a reference voltage ("V_REF"), and a nominal drop-out voltage ("V_DROP"). The term "first pole," above, is defined as the lowest frequency associated with a PSRR frequency response curve at which the magnitude begins to drop off at 20 decibels ("dB") per decade of frequency increase. The term "first zero," above, is defined as the lowest frequency associated with a PSRR frequency response curve at which the magnitude begins to become constant following the occurrence of the first pole. It is noted that R_INP may be specified on the LDO data sheet or may be selected as either a one megohm resistance or a ten megohm resistance.

The LDO analog behavior characterization instructions block 215 of the LDO modeling computer system 200 calculates R_ZERO as equal to PSSR*R_INP, C_POLE as equal to 1/(6.28*R_INP*POLE), C_ZERO as equal to 1/(6.28*R_ZERO*ZERO), R_FBK1 as equal to 1 megohm* (V_OUT-V_REF), and R_FBK_2 as equal to 1 megohm*V_REF. It is noted that R_FBK1 is equal to 1 megohm times the unit-less magnitude of (V_OUT-V_REF). Likewise, R_FBK1 is equal to 1 megohm time the unit-less magnitude of V_REF.

The LDO analog behavior characterization instructions block 215 also determines the results of a transfer function of ABB_1 as being ABB_1_VOUT=(MIN{MAX [(10*V_ENB-V_THR), 0], 1})*(MIN{MAX[(10*V_INP-UVLO), 0], V_REF}). The LDO analog behavior characterization instructions block 215 determines the results of a transfer function of ABB_2 as being ABB_2_VOUT= (ABB_1_OUT*V_OUT)/(V_FBK*10$^{-6}$). The LDO analog behavior characterization instructions block 215 determines the results of a transfer function of ABB_3 as being V_INT=MIN{ABB_2_OUT, MAX[(V_INP-V_DROP), 0]}.

Figure 5:
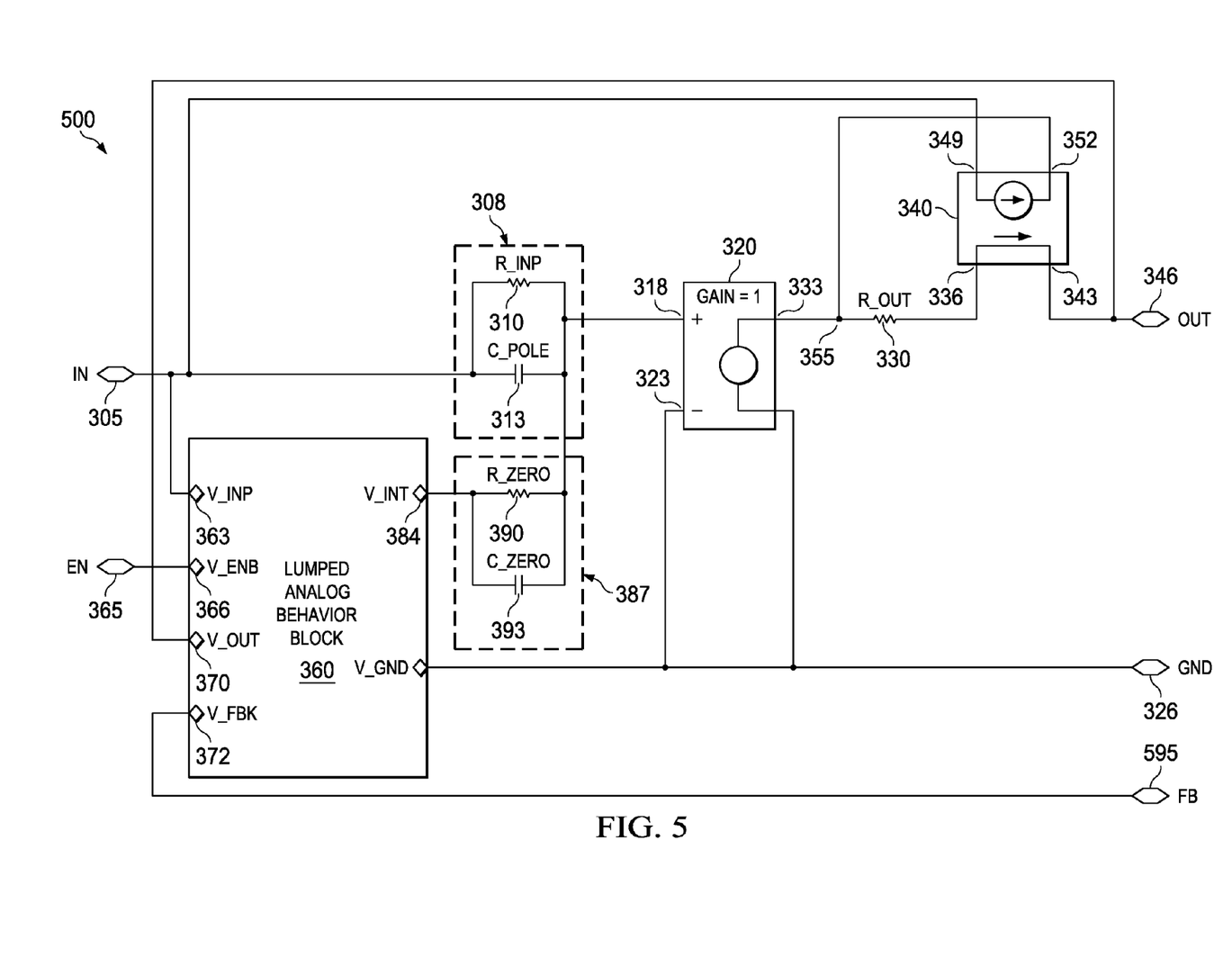
FIG. 5 is a schematic diagram of a generalized variable output voltage LDO base model according to various example embodiments.

FIG. 5 is a schematic diagram of a generalized variable output voltage LDO base model 500 according to various example embodiments. The variable output voltage LDO base model 500 includes an LDO input voltage terminal 305, a parallel RC input network 308, a VCVS 320, an LDO output ground terminal 326, an output resistor 330, a CCCS 340, an LDO output voltage terminal 346, an LABB 360, an LDO chip enable input terminal 365 and a parallel RC zero-creating filter 387, all as described previously with reference to the fixed output voltage LDO base model 300 of FIG. 3. For the sake of clarity and brevity, component details of the variable output voltage LDO base model 500 are not repeated here. The feedback resistors 378 and 380 of the fixed output voltage LDO base model 300 of FIG. 3 are omitted in the variable output voltage LDO 500. Instead, the fourth LABB input terminal 372 of the LDO 500 is coupled to an LDO feedback voltage input terminal 595 to receive the feedback voltage signal V_FBK. A voltage divider similar to the resistor 378 and 380 of FIG. 3 and external to the variable output voltage LDO base model 500 may provide the V_FBK signal to the LDO base model 500.

Figure 6A:
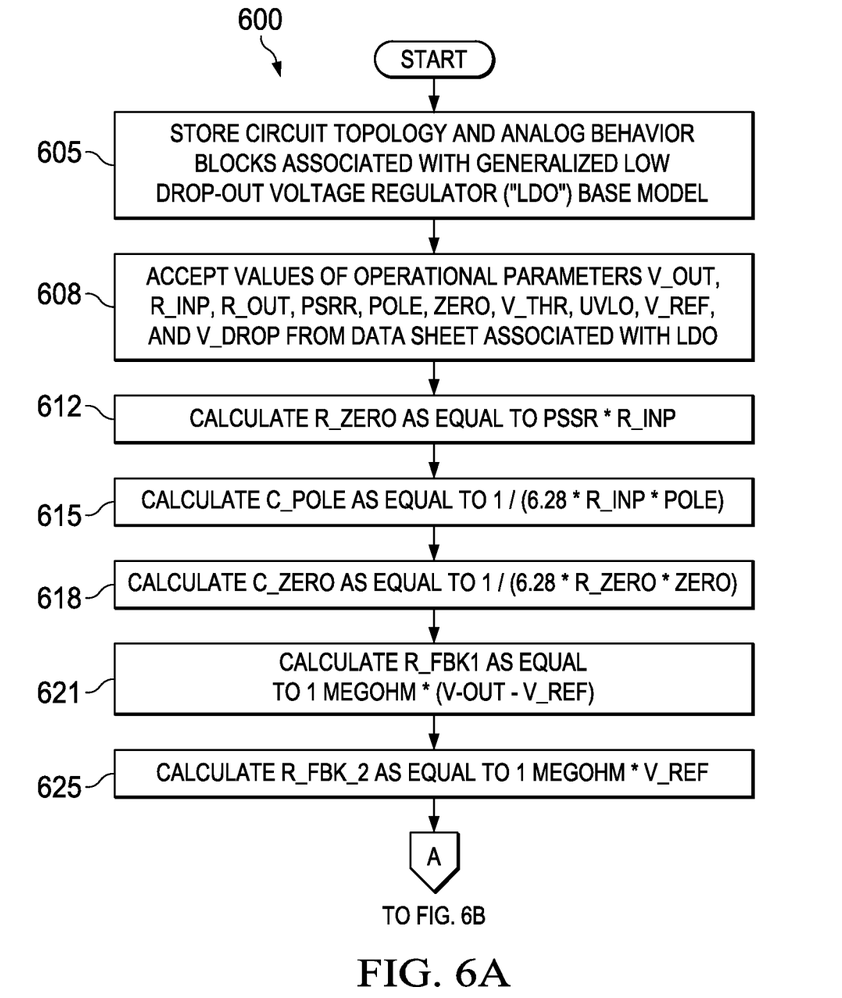
FIGS. 6A and 6B are a flow diagram of a method of transforming values of operational parameters from a data sheet associated with an LDO to values of electronic components, analog behavioral blocks, and nodal values associated with a computer model of the LDO according to various example sequences.
Figure 6B:
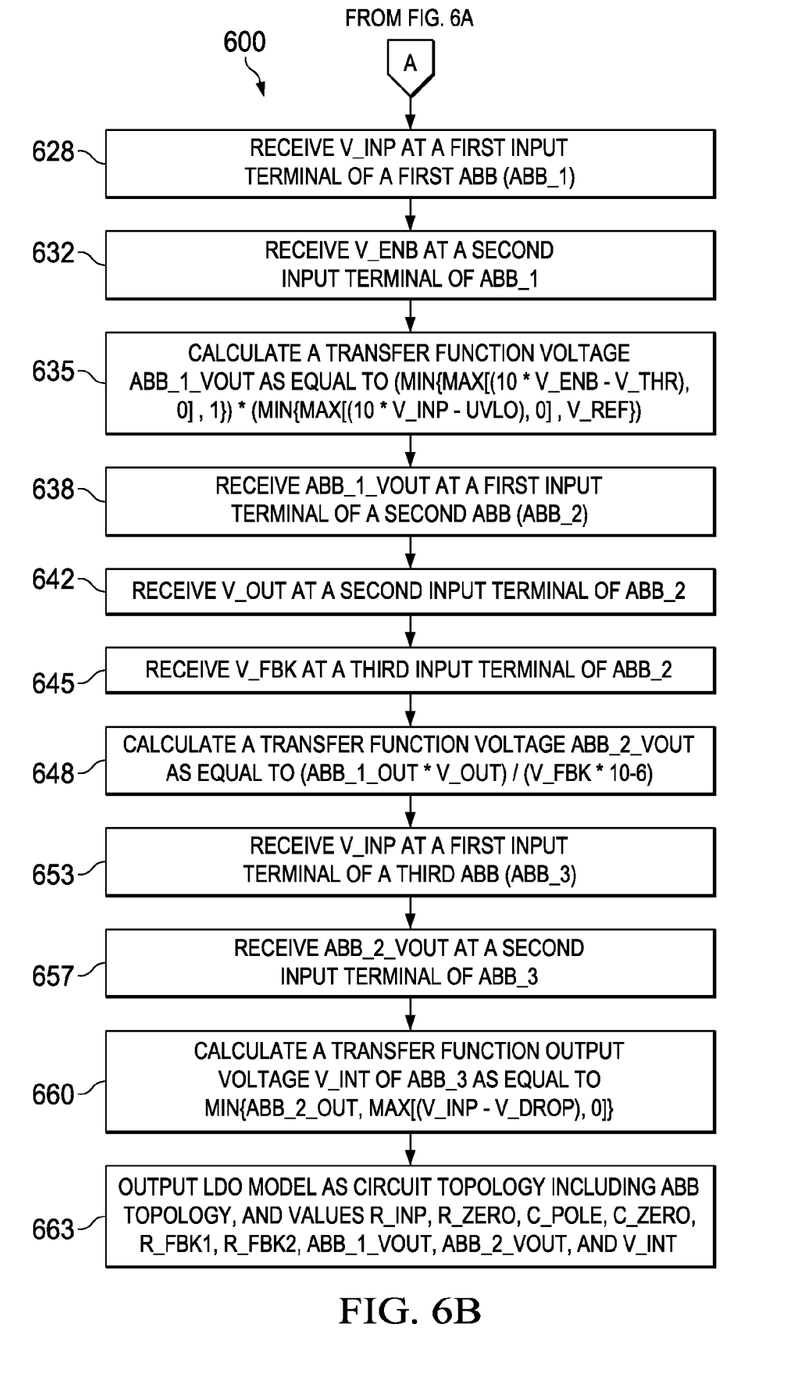

FIGS. 6A and 6B are a flow diagram of a method 600 of transforming values of operational parameters from a data sheet associated with an LDO to values of electronic components, ABB transfer function outputs and nodal values associated with a computer model of the LDO according to various example sequences. The method 600 includes receiving a set of operational parameters associated with a particular model of LDO, applying characteristics of a generalized base model LDO to the operational parameter values to effect the transformation, and outputting the computer model of the LDO.

The method 600 commences at block 605 with storing a circuit topology and a set of ABBs associated with a generalized LDO base model. The circuit topology of the base model is as described above in detail with reference to FIG. 3 for fixed output voltage LDOs and with reference to FIG. 5 for variable output voltage LDOs. The ABB topology is as described above in detail with reference to FIG. 4 for both fixed and variable output voltage LDOs. To avoid redundancy, those prior descriptions of FIGS. 3-5 are not repeated here.

The method 600 includes accepting the operational parameter values, at block 608. The operational parameters include V_OUT, R_INP, R_OUT, a power supply rejection ratio ("PSRR") defined as ΔV_OUT/ΔV_INP, a frequency of a first pole in a PSRR response characteristic ("POLE"), a frequency of a first zero in a PSRR response characteristic ("ZERO"), a threshold voltage ("V_THR") at which the LDO recognizes V_ENB, a minimum voltage level of V_INP ("UVLO") at which the LDO will operate, a reference voltage ("V_REF"), and a nominal drop-out voltage ("V_DROP").

The method 600 continues at block 612 with calculating an LDO computer model value R_ZERO as equal to PSSR*R_INP. The method 600 also includes calculating an LDO computer model value C_POLE as equal to 1/(6.28*R_INP*POLE), at block 615. The method 600 further includes calculating an LDO computer model value C_ZERO as equal to 1/(6.28*R_ZERO*ZERO), at block 618. The method 600 also includes calculating an LDO computer model value R_FBK1 as equal to 1 megohm*(V-OUT-V_REF), at block 621. The method 600 further includes calculating an LDO computer model value R_FBK_2 as equal to 1 megohm*V_REF, at block 625. It is again noted that R_FBK1 is equal to 1 megohm times the unit-less magnitude of (V_OUT-V_REF). Likewise, R_FBK1 is equal to 1 megohm time the unit-less magnitude of V_REF.

The method 600 also includes a number of transformations at a set of three cascaded ABBs (e.g., the cascaded ABBs of FIG. 4 represented by the LABB 360 of FIGS. 3 and 5). The method 600 continues at block 628 with receiving V_INP at a first input terminal of a first ABB (ABB_1). The method 600 includes receiving V_ENB at a second input terminal of ABB_1, at block 632. The method also includes calculating an LDO computer model transfer function voltage ABB_1_VOUT as equal to (MIN{MAX [(10*V_ENB-V_THR), 0], 1})*(MIN{MAX[(10*V_INP-UVLO), 0], V_REF}), at block 635.

The method 600 further includes receiving ABB_1_VOUT at a first input terminal of a second ABB (ABB_2), at block 638. The method 600 includes receiving V_OUT at a second input terminal of ABB_2, at block 642. The method 600 also includes receiving V_FBK at a third input terminal of ABB_2, at block 645. The method 600 further includes calculating an LDO computer model transfer function voltage ABB_2_VOUT as equal to (ABB$_{13}$1_OUT*V_OUT)/(V_FBK*10$^{-6}$), at block 648.

The method 600 continues at block 653 with receiving V_INP at a first input terminal of a third ABB (ABB_3). The method 600 includes receiving ABB_2_VOUT at a second input terminal of ABB_3, at block 657. The method 600 also includes calculating the LDO computer model value V_INT as a transfer function output voltage of ABB_3 equal to MIN{ABB_2_OUT, MAX[(V_INP-V_DROP), 0]}, at block 660.

The method 600 may terminate at block 663 with outputting the LDO model as the circuit topology of the base model (e.g., the circuit topologies of FIGS. 3 and 5), the cascaded ABB topology of the base model (e.g., the LABB topology of FIG. 4), component values of the base model circuit (e.g., the values R_INP, R_ZERO, C_POLE, C_ZERO, R_FBK1 and R_FBK2), and transfer function output values associated with the cascaded ABBs (e.g., the values ABB_1_OUT, ABB_2_OUT and V_INT). Some sequences of the method 600 output the LDO computer model in a format such as a netlist or VHDL for subsequent input to an electrical circuit simulator such as SPICE.

Some sequences of the method 600 may also include generating instantiation control values from the computer model of the LDO and performing device operations using the instantiation control values. For example, the method 600 may include generating display instantiation control values to a computer graphical display to cause the computer graphical display to create one or more representations of the computer model of the LDO. Considering another example, the method 600 may include generating IC die tooling instantiation control values to an IC die tooling sub-system. The IC die tooling instantiation control values cause the IC die tooling sub-system to create one or more IC die designs of the LDO.

Systems and methods described herein may be useful in applications other than transforming values of a set of operational parameters from a data sheet associated with an LDO into a computer model of the LDO. For example, The general structure of the LDO computer modeling system 200 may be extended to model other IC components. Such extension of functionality may be accomplished by revising the parameter value inputs 208A, the analog behavior characterization instructions block 215 and the base model table 220 of FIG. 2 as appropriate for a category of IC components other than LDOs. Thus, examples of the LDO computer modeling system 200 and the method 600 described herein are intended to provide a general understanding of the structures of various embodiments and the sequences of various methods. They are not intended to serve as complete descriptions of all elements and features of systems and methods that might make use of these example structures and sequences.

The various embodiments may be used to model electronic circuitry used in computers, communication and signal processing circuitry, single-processor or multi-processor modules, single or multiple embedded processors, multi-core processors, data switches, and application-specific modules including multi-layer, multi-chip modules, among others. The latter components and circuitry may be included as sub-components within a variety of electronic systems, such as televisions, cellular telephones, personal computers (e.g., laptop computers, desktop computers, smart phones, tablet computers, etc.), workstations, radios, video players, audio players (e.g., MP3 (Motion Picture Experts Group, Audio Layer 3) players), vehicles, medical devices (e.g., heart monitor, blood pressure monitor, etc.), set top boxes, and others.

Structures and methods disclosed herein transform simple parameter values from a data sheet associated with a particular LDO into a complete computer model of the LDO. Doing so advances the art by saving time and engineering cost associated with performing complex, time-intensive characterizations and modeling of the LDO as a preliminary step to modeling a circuit for which the LDO is a component.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A system, comprising:
   a computer specialized with blocks of instructions and data structures to transform values of a set of operational parameters from a data sheet associated with a low drop-out voltage regulator ("LDO") into a computer model of the LDO, the blocks of instructions and data structures to include:
   an LDO base model table to store base model values representing a circuit topology and a set of analog behavior blocks associated with a fixed output voltage LDO base model, the set of analog behavioral blocks comprising a lumped analog behavior block ("LABB") including:
      a first input terminal coupled to an input voltage terminal ("IN") to receive an input voltage ("V_INP") from an input voltage source,
      a second input terminal coupled to an output voltage terminal ("OUT") to receive a nominal regulated output voltage ("V_OUT"),
      a third input terminal coupled to a junction of two feedback resistors to receive a feedback voltage signal ("V_FBK"), V_FBK representing a portion of the nominal regulated output voltage, and
      an output terminal to output an intermediate voltage V_INT, the output terminal coupled to a terminal of a parallel resistor-capacitor ("RC") zero-creating filter including a resistor of resistance R_ZERO and a capacitor of capacitance C_ZERO, an opposite junction of the RC zero-creating filter coupled to the positive input of a voltage-controlled voltage source ("VCVS");

an LDO parameter input instructions block to accept the parameter values;

an LDO analog behavior characterization instructions block to apply characteristics of the base model to the parameter values to effect the transformation; and an LDO characterization output instructions block to output the computer model of the LDO.

2. The system of claim 1, further comprising:

an LDO characterization instantiation instructions block to generate instantiation control values, the instantiation control values to be used by a device to perform operations based upon the computer model of the LDO.

3. The system of claim 2, further comprising:

an LDO model graphical display instantiation instruction block to provide display instantiation control values to a graphical display to cause the graphical display to create at least one representation of the computer model of the LDO.

4. The system of claim 2, further comprising:

an LDO model die tooling instantiation instruction block to provide integrated circuit ("IC") die tooling instantiation control values to an IC die tooling sub-system to cause the IC die tooling sub-system to create at least one IC die design of the LDO.

5. The system of claim 1, the circuit topology and set of analog behavior blocks associated with the fixed output voltage LDO base model further comprising:

the input voltage terminal ("IN") to receive the input voltage ("V_INP") from the input voltage source;

a parallel RC input network to include an input resistor representing an estimated LDO input resistance R_INP and an input capacitor representing a pole capacitance C_POLE associated with a frequency response of the LDO, the parallel RC input network coupled in series between IN and a positive input terminal of the VCVS and a negative input terminal of the VCVS coupled to an output ground terminal ("GND"); and an output resistor representing a nominal output resistance R_OUT of the LDO coupled in series between a positive output terminal of the VCVS and an input source terminal of a current-controlled current source ("CCCS"), an input sink terminal of the CCCS coupled to an output voltage terminal ("OUT"), an output source terminal of the CCCS coupled to IN and an output sink terminal of the CCCS coupled to a node between the positive output terminal of the VCVS and the output resistor.

6. The system of claim 5, the LABB further comprising:

a set of cascaded ABBs including ABB_1 with a first input terminal to receive V_INP, a second input terminal to receive V_ENB and an output terminal to output a first ABB transfer function voltage ABB_1_VOUT, ABB_2 with a first input terminal to receive ABB_1_VOUT, a second input terminal to receive V_OUT, a third input terminal to receive V_FBK and an output terminal to output a second ABB transfer function voltage ABB_2_VOUT, and ABB_3 with a first input terminal to receive V_INP, a second input terminal to receive ABB_2_VOUT, and an output terminal to output V_INT.

7. The system of claim 6, the set of operational parameters to include V_OUT, R_INP, R_OUT, a power supply rejection ratio ("PSRR") defined as $\Delta V\_OUT/\Delta V\_INP$, a frequency of a first pole in a PSRR response characteristic ("POLE"), a frequency of a first zero in a PSRR response characteristic ("ZERO"), a threshold voltage ("V_THR") at which the LDO recognizes V_ENB, a minimum voltage level of V_INP ("UVLO") at which the LDO will operate, a reference voltage ("V_REF"), and a nominal drop-out voltage ("V_DROP").

8. The system of claim 7, the computer model of the LDO to include R_ZERO equal to PSSR*R_INP, C_POLE equal to 1/(6.28*R_INP*POLE), C_ZERO equal to 1/(6.28*R_ZERO*ZERO), R_FBK1 equal to 1 megohm*(V-OUT−V_REF), and R_FBK_2 equal to 1 megohm*V_REF.

9. The system of claim 7, the computer model of the LDO to include a transfer function of ABB_1 as ABB_1_OUT= (MIN{MAX[(10*V_ENB−V_THR), 0], 1})*(MIN{MAX[(10 V_INP−UVLO), 0], V_REF}).

10. The system of claim 9, the computer model of the LDO to include a transfer function of ABB_2 as ABB_2_VOUT=(ABB_1_OUT*V_OUT)/(V_FBK*$10^{-6}$).

11. The system of claim 10, the computer model of the LDO to include a transfer function of ABB_3 as V_INT=MIN{ABB_2_OUT, MAX[(V_INP−V_DROP), 0]}.

12. A system, comprising:

a computer specialized with blocks of instructions and data structures to transform values of a set of operational parameters from a data sheet associated with a variable output voltage low drop-out voltage regulator ("LDO") into a computer model of the LDO, the blocks of instructions and data structures to include:

an LDO base model table to store base model values representing a circuit topology and a set of analog behavior blocks associated with a variable output voltage LDO base model, the set of analog behavioral blocks comprising a lumped analog behavior block ("LABB") including:

a first input terminal coupled to an input voltage terminal ("IN") to receive an input voltage ("V_INP") from an input voltage source, a second input terminal coupled to a chip enable input terminal ("EN") to receive a chip enable input voltage ("V_ENB"), a third input terminal coupled to an output voltage terminal ("OUT") to receive a nominal regulated output voltage ("V_OUT"), a fourth input terminal coupled to an LDO feedback input signal terminal ("FB"), and an output terminal to output an intermediate voltage V_INT, the output terminal coupled to a junction of a parallel resistor-capacitor ("RC") zero-creating filter including a resistor of resistance R_ZERO and a capacitor of capacitance C_ZERO, an opposite junction of the RC zero-creating filter coupled to the positive input of the VCVS;

an LDO parameter input instructions block to accept the parameter values;

an LDO analog behavior characterization instructions block to apply characteristics of the base model to the parameter values to effect the transformation;

an LDO characterization output instructions block to output the computer model of the LDO;

an LDO model graphical display instantiation instruction block to provide display instantiation control values to a computer graphical display to cause the computer graphical display to create at least one representation of the computer model of the LDO; and an LDO model die tooling instantiation instruction block to provide integrated circuit ("IC") die tooling instantiation control values to an IC die tooling sub-system to cause the IC die tooling sub-system to create at least one IC die design of the LDO.

13. The system of claim 12, the circuit topology associated with the variable output voltage LDO base model further comprising:
the LDO input voltage terminal ("IN") to receive the input voltage ("V_INP") from the input voltage source;
a parallel RC input network to include an input resistor representing an estimated LDO input resistance R_INP and an input capacitor representing a pole capacitance C_POLE associated with a frequency response of the LDO, the parallel RC input network coupled in series between IN and a positive input terminal of the VCVS and a negative input terminal of the VCVS coupled to an output ground terminal ("GND"); and
an output resistor representing a nominal output resistance R_OUT of the LDO coupled in series between a positive output terminal of the VCVS and an input source terminal of a current-controlled current source ("CCCS"), an input sink terminal of the CCCS coupled to an LDO output voltage terminal ("OUT"), an output source terminal of the CCCS coupled to IN and an output sink terminal of the CCCS coupled to a node between the positive output terminal of the VCVS and the output resistor.

14. The system of claim 13, the LABB further comprising:
a set of cascaded ABBs including ABB_1 with a first input terminal to receive V_INP, a second input terminal to receive V_ENB and an output terminal to output a first ABB transfer function voltage ABB_1_VOUT, ABB_2 with a first input terminal to receive ABB_1_VOUT, a second input terminal to receive V_OUT, a third input terminal to receive V_FBK and an output terminal to output a second ABB transfer function voltage ABB_2_VOUT, and ABB_3 with a first input terminal to receive V_INP, a second input terminal to receive ABB_2_VOUT, and an output terminal to output V_INT.

15. A method of transforming values of a set of operational parameters from a data sheet associated with a low drop-out voltage regulator ("LDO") into a computer model of the LDO, comprising:
storing a circuit topology and a set of analog behavior blocks associated with a LDO base model, the LDO base model includes:
a lumped analog behavior block ("LABB") with a first input terminal coupled to an input voltage terminal ("IN") to receive an input voltage ("V_INP") from an input voltage source,
a second input terminal coupled to a chip enable input terminal ("EN") to receive a chip enable input voltage ("V_ENB"),
a third input terminal coupled to an output voltage terminal ("OUT") to receive a nominal regulated output voltage ("V_OUT"),
a fourth input terminal coupled to a junction of two feedback resistors to receive a feedback voltage signal ("V_FBK"), a first of the two feedback resistors of resistance R_FBK1 coupled to an input source terminal of a current-controlled current source ("CCCS") and a second of the two feedback resistors of resistance R_FBK2 coupled an output ground terminal ("GND"), and
an output terminal to output an intermediate voltage V_INT, the output terminal coupled to a junction of a parallel resistor-capacitor ("RC") zero-creating filter including a resistor of resistance R_ZERO and a capacitor of capacitance C_ZERO, an opposite junction of the RC zero-creating filter coupled to a positive input terminal of a voltage-controlled voltage source ("VCVS");
accepting the operational parameter values;
applying characteristics of the base model to the parameter values to effect the transformation; and
outputting the computer model of the LDO.

16. The method of claim 15, further comprising:
generating instantiation control values from the computer model of the LDO; and
performing device operations using the instantiation control values.

17. The method of claim 15, the circuit topology associated with the LDO base model to include:
the input voltage terminal ("IN") to receive the input voltage ("V_INP") from the input voltage source;
a parallel RC input network to include an input resistor representing an estimated LDO input resistance R_INP and an input capacitor representing a pole capacitance C_POLE associated with a frequency response of the LDO, the parallel RC input network coupled in series between IN and the positive input terminal of the VCVS and a negative input terminal of the VCVS coupled to GND;
an output resistor representing a nominal output resistance R_OUT of the LDO coupled in series between a positive output terminal of the VCVS and the input source terminal of a current-controlled current source ("CCCS"), an input sink terminal of the CCCS coupled to OUT, an output source terminal of the CCCS coupled to IN and an output sink terminal of the CCCS coupled to a node between the positive output terminal of the VCVS and the output resistor.

18. The method of claim 17, the set of operational parameters to include V_OUT, R_INP, R_OUT, a power supply rejection ratio ("PSRR") defined as $\Delta V\_OUT/\Delta V\_INP$, a frequency of a first pole in a PSRR response characteristic ("POLE"), a frequency of a first zero in a PSRR response characteristic ("ZERO"), a threshold voltage ("V_THR") at which the LDO recognizes V_ENB, a minimum voltage level of V_INP ("UVLO") at which the LDO will operate, a reference voltage ("V_REF"), and a nominal drop-out voltage ("V_DROP").

19. The method of claim 18, further comprising:
calculating the LDO computer model value R_ZERO as equal to PSSR*R_INP;
calculating the LDO computer model value C_POLE as equal to 1/(6.28*R_INP*POLE);
calculating the LDO computer model value C_ZERO as equal to 1/(6.28*R_ZERO*ZERO);
calculating the LDO computer model value R_FBK1 as equal to 1 megohm (V-OUT−V_REF); and
calculating the LDO computer model value R_FBK_2 as equal to 1 megohm*V_REF.

20. The method of claim 19, transformations at a set of three cascaded analog behavior blocks ("ABBs") represented by the LABB further comprising:
receiving V_INP at a first input terminal of a first ABB (ABB_1);
receiving V_ENB at a second input terminal of ABB_1;
calculating an LDO computer model transfer function voltage ABB_1_VOUT as equal to (MIN{MAX[(10*V_ENB−V_THR), 0], 1})*(MIN{MAX[(10*V_INP−UVLO), 0], V_REF});

receiving ABB_1_VOUT at a first input terminal of a second ABB (ABB_2);
receiving V_OUT at a second input terminal of ABB_2;
receiving V_FBK at a third input terminal of ABB_2;
calculating an LDO computer model transfer function voltage ABB_2_VOUT as equal to (ABB_1_OUT*V_OUT)/(V_FBK*10$^{-6}$);
receiving V_INP at a first input terminal of a third ABB (ABB_3);
receiving ABB_2_VOUT at a second input terminal of ABB_3; and
calculating the LDO computer model value V_INT as a transfer function output voltage of ABB_3 equal to MIN{ABB_2_OUT, MAX[(V_INP−V_DROP), 0]}.

* * * * *